United States Patent
Hirose

(10) Patent No.: US 6,526,331 B2
(45) Date of Patent: Feb. 25, 2003

(54) ROBOT ARM

(75) Inventor: Masato Hirose, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/988,026

(22) Filed: Nov. 16, 2001

(65) Prior Publication Data

US 2002/0068996 A1 Jun. 6, 2002

(30) Foreign Application Priority Data

Nov. 17, 2000 (JP) ........................... 2000-351696

(51) Int. Cl.$^7$ ................................. G06F 19/00
(52) U.S. Cl. ................ 700/245; 700/246; 700/247; 700/249; 700/250; 700/251; 700/253; 318/568.1; 318/568.12; 318/568.2; 901/1; 901/9; 901/46; 901/48; 701/23
(58) Field of Search ................ 700/245–247, 700/250, 251, 253, 249, 264, 259, 262; 318/568.1, 568.12, 568.2; 901/1, 9, 46–48; 701/23; 180/8.6; 414/217, 783, 226.01, 411, 416.03, 730, 754; 74/490.03

(56) References Cited

U.S. PATENT DOCUMENTS 5,369,346 A * 11/1994 Takahashi et al. ..... 318/568.17
5,378,969 A * 1/1995 Haikawa ................ 318/568.12

(List continued on next page.)

FOREIGN PATENT DOCUMENTS

| DE | 2 228 598 | | 1/1974 |
| EP | 0 661 614 A2 | * | 12/1994 |
| EP | 1 060 383 A1 | | 11/2000 |
| EP | 1 103 450 A1 | * | 11/2000 |

OTHER PUBLICATIONS

Nicholls, Bipedal dynamic walking in robotics, 1998, Internet, pp. 1–74.*
Hirai et al. The developoment of Honda humanoid robot, 1998, IEEE, pp. 1321–1326.*
Hwang et al., Motion planning of eye, hand and body of humanoid robot, 1997, IEEE, pp. 231–236.*
Atkenson et al., Using humanoid robot to study human behavior, 2000, Internet, pp. 46–56.*
Adams et al., Humanoid Robotis: A new king of tool, 2000, Internet, pp. 20–31.*
Ishiguro et al., Robotive: A robot generates episode chanins on our daily file, Apr. 2001, Internet, pp. 1–6.*
Price et al., A lightweight plastic robotic humanoid, 2000, Internet/IEEE, pp. 1571–1576.*
Konno et al., Development of a light–weight biped humanoid robot, IEEE, 2000, pp. 1565–1570.*
"Development of a Humanoid Robot Sakai", Konno et al, *Intelligent Robots and Systems*, 1997, Sep. 7, 1997, pp. 805–810.
"Development of Autonomuos Mobile Humanoid Robot", Aramaki et al, *Industrial Electronics Society*1999, Nov. 29, 1999, pp. 529–534.

Primary Examiner—William A. Cuchlinski, Jr.
Assistant Examiner—McDieunel Marc
(74) Attorney, Agent, or Firm—Arent Fox Kintner Plotkin & Kahn, PLLC

(57) ABSTRACT

A robot arm which allows the two hands to be brought together in front of the chest. In a robot arm comprising a shoulder joint attached to a body so as to be rotatable around a laterally extending axial line, an upper arm attached to the shoulder joint so as to be rotatable around an axial line perpendicular to the laterally extending axial line, a forearm attached to the upper arm via an elbow joint, and a hand attached to a free end of the forearm, the elbow joint is attached to the upper arm so as to be rotatable around a longitudinal axial line of the upper arm.

5 Claims, 4 Drawing Sheets

U.S. PATENT DOCUMENTS

| | | | |
|---|---|---|---|
| 5,402,050 A | * 3/1995 | Ozawa | 318/568.12 |
| 5,404,086 A | * 4/1995 | Takenaka et al. | 318/568.12 |
| 5,416,393 A | * 5/1995 | Gomi et al. | 318/568.2 |
| 5,594,644 A | * 1/1997 | Hasegawa et al. | 318/567 |
| 5,697,256 A | 12/1997 | Matteo | |
| 5,737,217 A | * 4/1998 | Nishikawa et al. | 700/56 |
| 5,872,893 A | * 2/1999 | Takenaka et al. | 700/245 |
| 6,021,363 A | * 2/2000 | Nishikawa et al. | 700/253 |
| 6,243,623 B1 | * 6/2001 | Takenaka et al. | 700/245 |

* cited by examiner

ROBOT ARM

TECHNICAL FIELD

The present invention relates to a robot arm.

BACKGROUND OF THE INVENTION

The arm of a conventional humanoid robot is typically attached to the body via a shoulder joint so as to be rotatable both in the fore-and-aft and lateral directions. According to this structure, the two hands can be brought together in front of the chest only by swinging the arms forward and then laterally toward each other. Therefore, the elbows must be kept fully stretched at such a time.

However, when the humanoid robot walks in an upright position (bipedal motion) carrying a relatively heavy object, it is desirable to hold the object as close to the center of the body as possible to minimize the shift in the gravitational center of the robot. However, according to the conventional structure, because the two hands cannot be brought together immediately in front of the chest, the kinds of work which the robot is capable of were limited.

BRIEF SUMMARY OF THE INVENTION

In view of such problems of the prior art, a primary object of the present invention is to provide an improved robot arm which allows the two hands to be brought together in front of the chest.

A second object of the present invention is to provide a robot arm which is capable of holding a relatively heavy object without excessively tipping the balance of the robot.

A third object of the present invention is to provide a robot arm which has an increased freedom of motion.

To achieve such an object, the present invention provides a robot arm attached to a side of a robot body, comprising: an upper arm having a base end attached a side of a robot body via a shoulder joint so as to be rotatable around a laterally extending first axial line and a second axial line perpendicular to said first axial line; a forearm having a base end attached to a free end of said upper arm via an elbow joint having bifurcated ends, said forearm base end being interposed between said bifurcated ends so as to be rotatable around a third axial line extending along the length of the upper arm and a fourth axial line perpendicular to said third axial line; and a hand attached to a free end of said forearm.

Thus, the elbow joint can be twisted with respect to the upper arm so that the hands can be brought together in front of the chest. Therefore, the robot is capable of holding a heavy object close to its chest or belly without unduly shifting the gravitational center of the robot. The freedom of motion of the arm is also enhanced.

Furthermore, if the hand is attached to the forearm so as to be rotatable around a longitudinal axial line of the forearm, the freedom of the motion of the arm can be increased even further.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
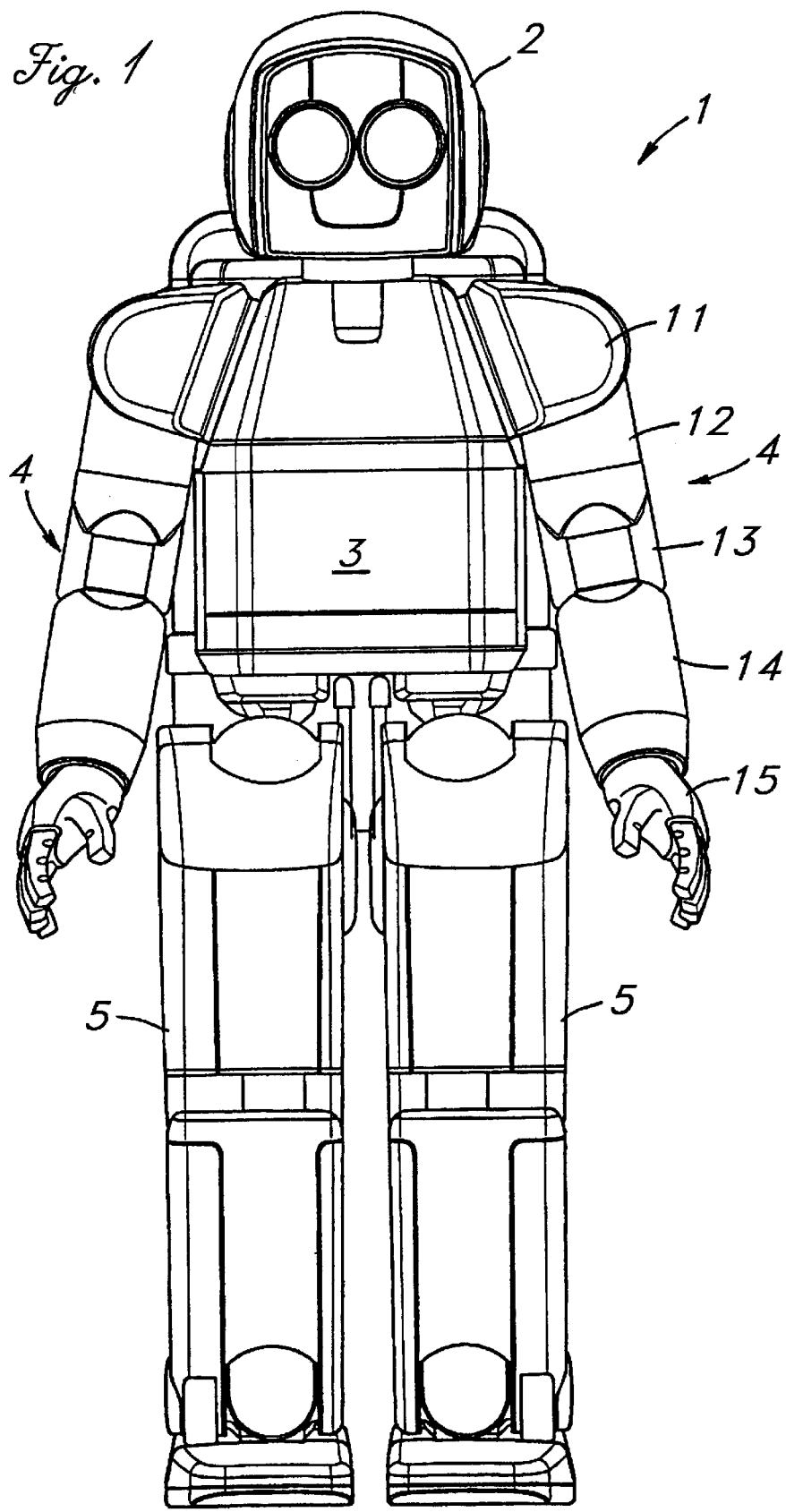
FIG. 1 is a front view of a humanoid robot embodying the present invention.
Figure 2:
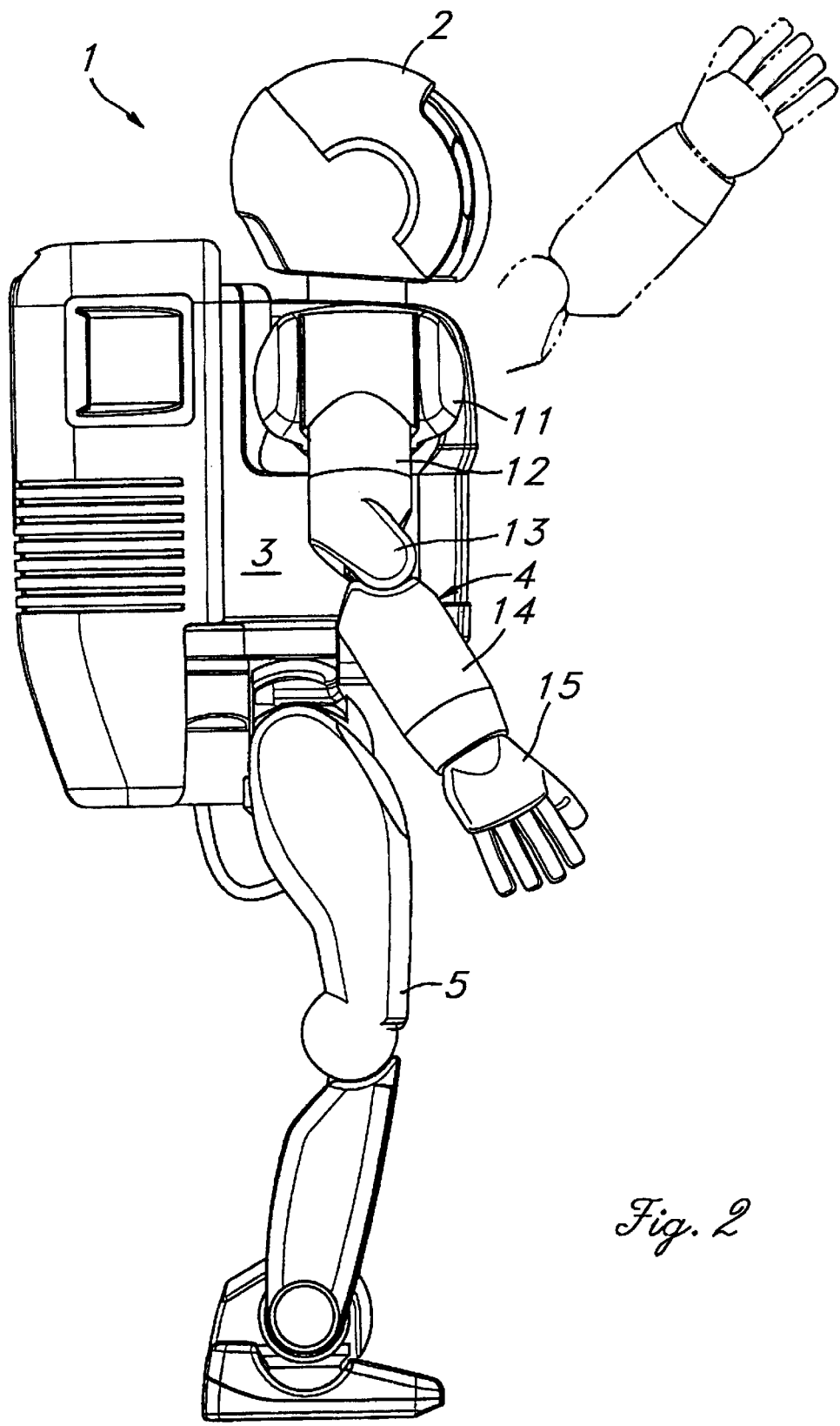
FIG. 2 is a left side view of the humanoid robot embodying the present invention.
Figure 3:
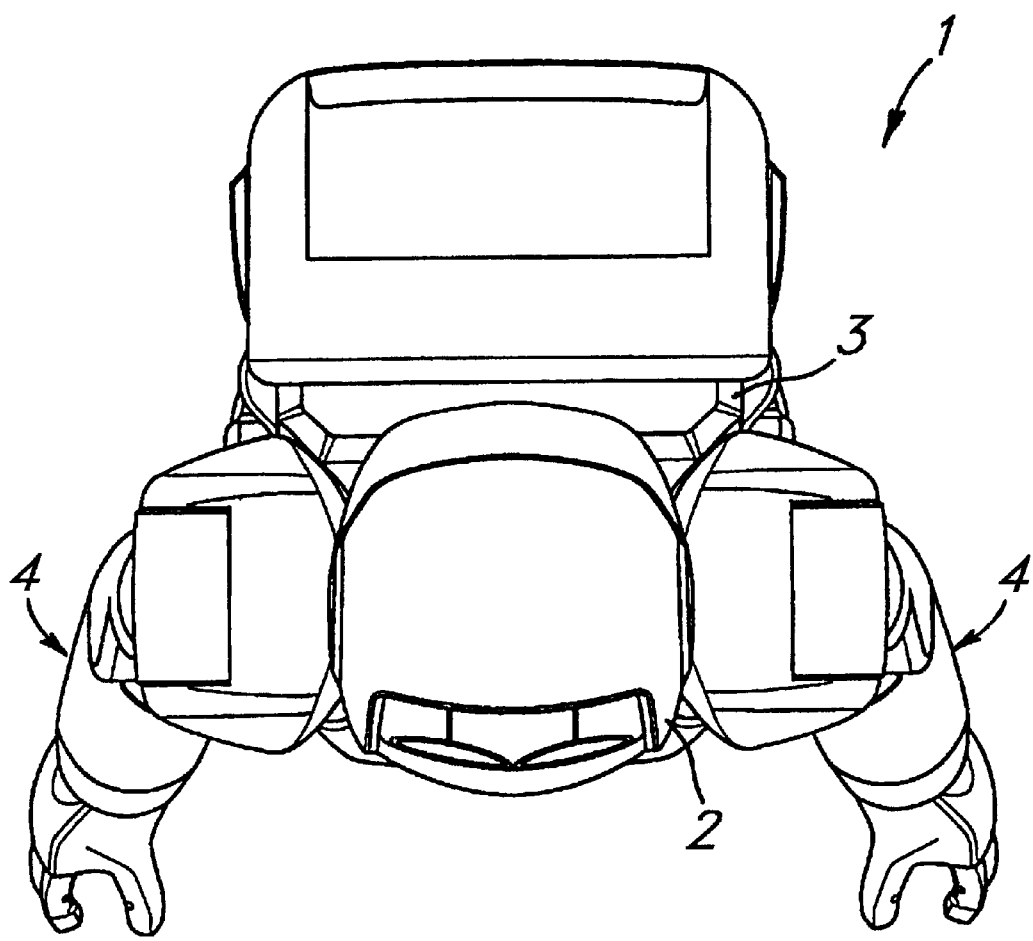
FIG. 3 is a top view of the humanoid robot embodying the present invention.

FIGS. 1 to 3 show the overall external appearance of a humanoid robot embodying the present invention. This robot 1 is modeled after a lower grade primary school child, and comprises a head 2 incorporated with a visual unit and a speech unit, a body 3 supporting a control unit and incorporated with batteries, and two legs 5 each having joints so as be able to move substantially in the same way as human legs. The robot is thus adapted to walk on two feet.

Figure 4:
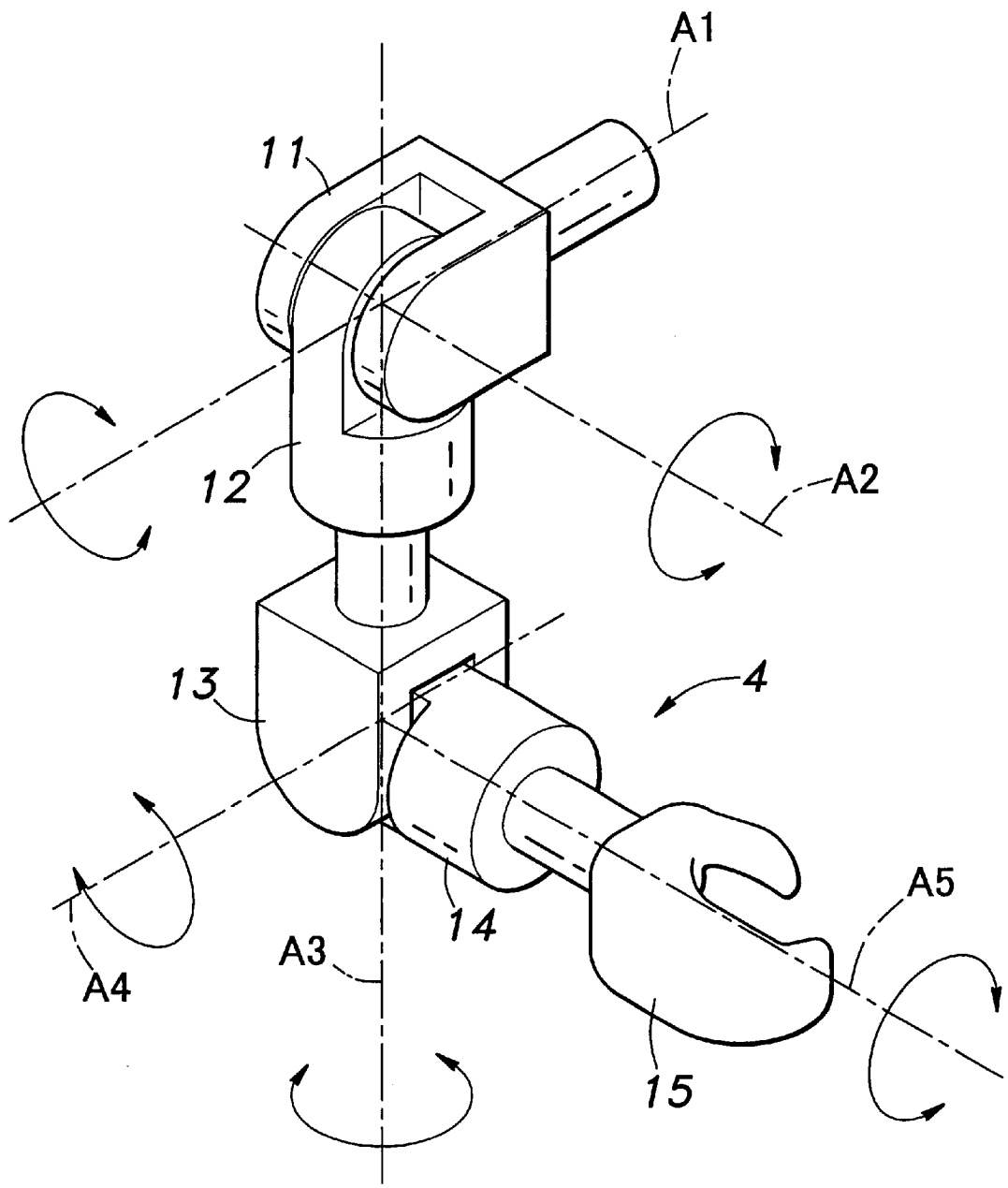
FIG. 4 is a model diagram for explaining the possible motions of the arm.

The arm 4 of this robot 1 is described in more detail with reference to FIG. 4. This arm 4 comprises a shoulder joint 11 attached to a body 3 so as to be rotatable around a laterally extending axial line A1, an upper arm 12 attached to the shoulder joint 11 so as to be rotatable around a fore-and-aft extending axial line A2, an elbow joint 13 attached to the upper arm 12 so as to be rotatable around a longitudinal axial line A3 of the upper arm 12, a forearm 14 attached to the elbow joint 13 so as to be rotatable around an axial line A4 perpendicular to the longitudinal axial line A3 of the upper arm 12, and a hand 15 attached to the forearm 14 so as to be rotatable around a longitudinal axial line A5 of the forearm 14.

Each of the rotatable parts is incorporated with a rotary actuator powered by an electric motor, for instance. The arm 4 as a whole can be swung in both the fore-and-aft and lateral directions around the shoulder joint 11. The forearm 14 can be bent relative to the upper arm 12 via the elbow joint 13, and can also be twisted relative to the upper arm 12. Thus, both the upper am 12 and forearm 14 are capable of a twisting motion, and the arm can effect a desired motion by combining these motions.

For instance, the robot can shake a hand by swinging the forearm 14 forward around the elbow joint 13 with the upper arm 12 hanging down with respect to the body 3 and by twisting the forearm 14 so as to face the palm of the hand 15 inward. By twisting the forearm 14 from this state until the palm of the hand 15 faces upward or downward, the robot can be brought to positions for receiving or grabbing an object.

By swinging up the upper arms 12 of each arm 4 from the position for shaking a hand and inwardly twisting the upper arm 12, the forearm 14 can be brought together in front of the chest. By appropriately adjusting the angle of the upper arm 12 with respect to the shoulder joint 11 and the angle between the upper arm 12 and forearms 14 at the elbow joint 13, the robot can take the positions for praying and receiving an object with both hands in front of the chest.

Thus, according to the present invention, because the humanoid robot can bring the two hands together in front of the chest, the range of the work that can be done by the robot can be expanded, and the robot can be made to move substantially in the same way as a human.

Although the present invention has been described in terms of a preferred embodiment thereof, it is obvious to a person skilled in the art that various alterations and modifications are possible without departing from the scope of the present invention which is set forth in the appended claims.

What is claimed is:

1. A robot arm attached to a side of a robot body, comprising:

an upper arm having a base end attached to a side of the robot body via a shoulder joint so as to be rotatable around a laterally extending first axial line and a second axial line perpendicular to said first axial line;

a forearm having a base end attached to a free end of said upper arm via an elbow joint having bifurcated ends, said forearm base end being interposed between said bifurcated ends so as to be rotatable around a third axial line extending along the length of the upper arm and a fourth axial line perpendicular to said third axial line; and a hand attached to a free end of said forearm.

2. A robot arm according to claim 1, wherein said hand is attached to the free end of said forearm so as to be rotatable around a fifth axial line extending along the length of the forearm.

3. A robot arm according to claim 2, wherein said robot body consists of a humanoid robot having said arm on each side thereof.

4. A robot arm according to claim 1, wherein said shoulder joint comprises a shoulder joint member attached to the side of said robot body so as to be rotatable around the laterally extending first axial line, and said base end of said upper arm is attached to said shoulder joint member so as to be rotatable around said second axial line perpendicular to said first axial line.

5. A robot arm according to claim 1, wherein said elbow joint comprises an elbow joint member attached to the free end of said upper arm so as to be rotatable around said third axial line extending along the length of said upper arm, and the base end of said forearm is attached to said elbow joint member so as to be rotatable around said fourth axial line perpendicular to said third axial line.

* * * * *